United States Patent [19]
Hollenbaugh et al.

[11] Patent Number: 6,100,942
[45] Date of Patent: Aug. 8, 2000

[54] MONITOR MOUNTABLE STORAGE DEVICE AND SPEAKER HOLDER

[76] Inventors: Jim Hollenbaugh, 24711 Paseo Vendaval, Lake Forest, Calif. 92630; Charlie Schook, 22985 Caminito Lago, Laguna Hills, Calif. 92653

[21] Appl. No.: 09/017,116

[22] Filed: Jan. 31, 1998

[51] Int. Cl.[7] .................................................. H04H 5/64
[52] U.S. Cl. ........................ 348/836; 312/7.2; 312/9.47; 248/918; 248/287.1; 248/220.22
[58] Field of Search ...................... 312/7.2, 9.47, 312/9.9, 237; 348/836; 248/918, 442.2, 447.2, 220.22, 279, 287.1

[56] References Cited

U.S. PATENT DOCUMENTS

| | | | |
|---|---|---|---|
| 4,624,510 | 11/1986 | Jedziniak | 312/252 |
| 4,869,565 | 9/1989 | Bachman | 312/234 |
| 4,960,257 | 10/1990 | Waters | 248/442.2 |
| 5,035,392 | 7/1991 | Gross et al. | 248/442.2 |
| 5,082,235 | 1/1992 | Crowther et al. | 248/231.41 |
| 5,125,612 | 6/1992 | McNeal | 248/442.2 |
| 5,190,258 | 3/1993 | Yu | 248/279 |
| 5,292,099 | 3/1994 | Isham et al. | 248/442.2 |
| 5,615,854 | 4/1997 | Nomura et al. | 248/287.1 |
| 5,639,060 | 6/1997 | Spoonts et al. | 248/683 |
| 5,701,347 | 12/1997 | Daniels et al. | 361/681 |

FOREIGN PATENT DOCUMENTS 2208797  9/1987  Japan ..................................... 348/836

*Primary Examiner*—Anthony D. Barfield
*Assistant Examiner*—Jerry A. Anderson
*Attorney, Agent, or Firm*—Gene Scott-Patent Law & Venture Group

[57] ABSTRACT

The present invention provides an organizer apparatus for use with a computer monitor. The organizer apparatus has a base which is sized and shaped to rest on top of the computer monitor. The base has a bracket reception means, preferably a slot through either side of the base. The base includes, in various embodiments, a variety of storage devices in several different configurations, including a media storage bin for CD-ROMs. The base preferably further includes a CR-ROM and 3.5 inch floppy drive. A pair of brackets engage with the base in opposing locked positions. Each of the brackets includes an upper horizontal portion for engagement with the base, a vertical portion for laying adjacent to one side of the video monitor and a lower horizontal portion having the speaker supporting stand. In the preferred embodiment, the organizer apparatus further includes a folder bin bonded to the monitor with two sided adhesive tape and positioned between the vertical portion of at least one of the brackets. The folder bin means is designed for accepting paper folder storage.

10 Claims, 4 Drawing Sheets

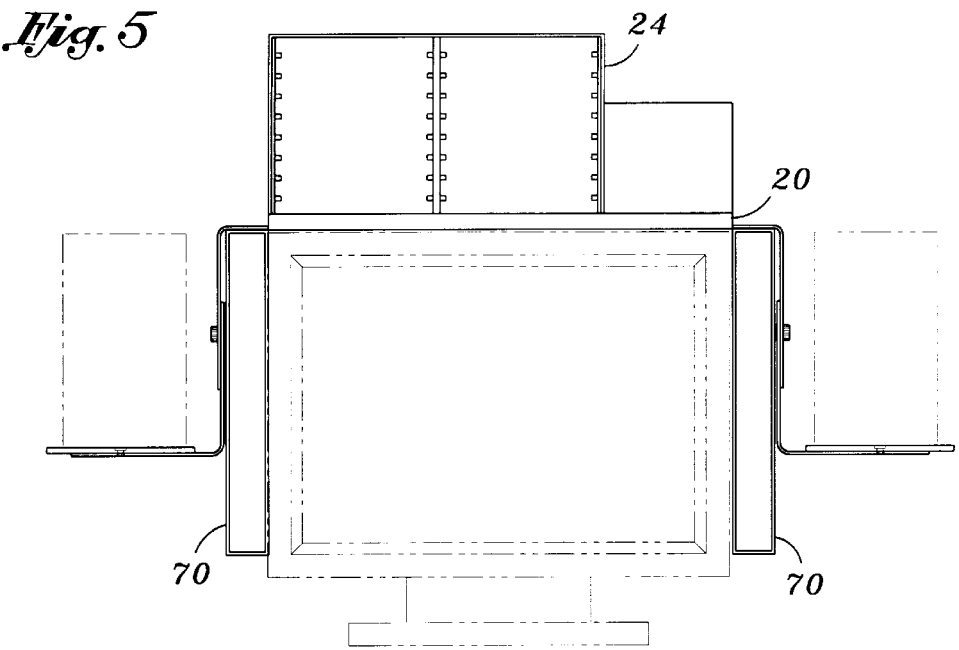
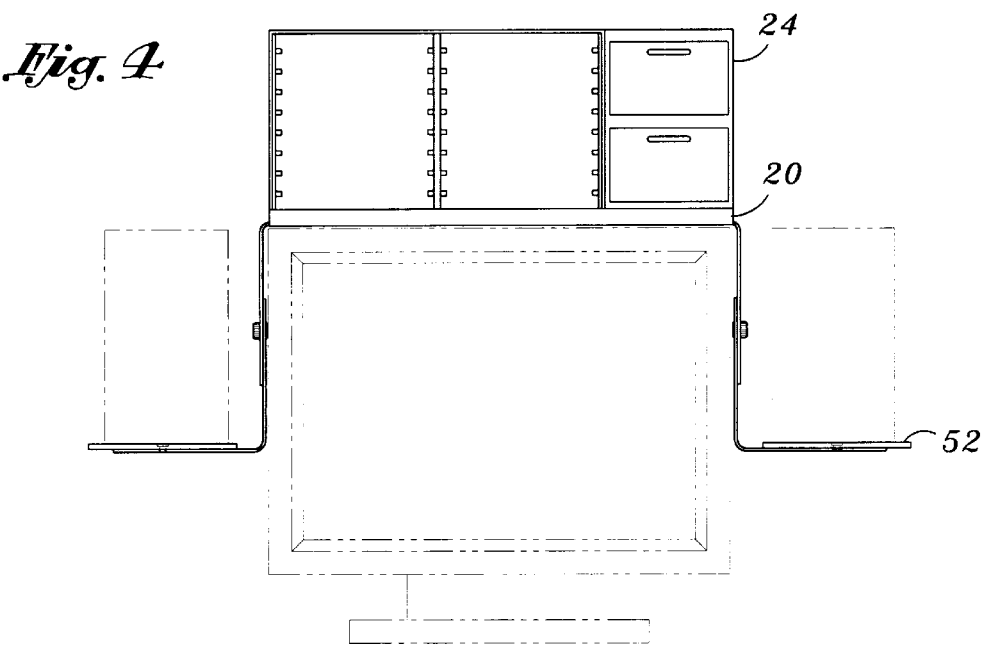

6,100,942

MONITOR MOUNTABLE STORAGE DEVICE AND SPEAKER HOLDER

BACKGROUND OF THE INVENTION

1. Field of the Invention

This invention relates generally to storage devices for materials associated with, and used with a desk-top computer system, and more particularly to a storage device and speaker holder which is adjustably mountable on a computer monitor.

2. Description of Related Art

The following art defines the present state of this field:

Nomura and Nakamura, U.S. Pat. No. 5,615,854, describes a camera stand to image not only the user in front of a camera but also documents situated below, a rail member is vertically attached to a sidewall of a display case, a slide rod fixing clamp is slidably mounted on the rail member, a slide rod is transversely displaceably mounted on the slide rod fixing clamp, an orthogonal rod is secured to a slide rod, and a camera mounting clamp is mounted on the orthogonal rod in such a manner that it is rotatable around the orthogonal rod. Thus, a camera can be positioned lower than in the instance where it is disposed on top of a display. Also, the camera can be directed downward by virtue of the camera mounting clamp.

Jedziniak, U.S. Pat. No. 4,624,510, describes a shelving system disclosed herein for use in storing data processing devices, said shelving system including cooling by blowers in the surfaces thereof for cooling the electronic equipment stored therein. The shelving system, furthermore, is pivotally fastened for convenient maintenance access with the pivotal motion thereof restrained by a locking mechanism. Alternatively, the shelving system may include locks in the various panels thereof which support a pivoted turntable to which the monitor of the data processing system is attached. This turntable includes a resilient panel compressed within the bearing which then imposes friction in the motion thereof for fixing the monitor alignment.

Isham, U.S. Pat. No. 5,292,099, describes a display mounted document holder devised to clamp to a display monitor, having a document platen on either the right side or the left side, or both sides, wherein the document platen can be positioned vertically in a plurality of positions, and wherein the document platen is normally tilted and oriented so as to substantially face the user, but is capable of being tilted in a variety of angles. The document platen may be swung from a position substantially facing a user to a position substantially facing the side of the display monitor to free valuable working space. The document platen is swung by means of a hinge located on the arm which secures the position of the document holder relative to the display monitor. The hinging action is monitored by a locking mechanism which may be operated from either the left or right sides of the display monitor. The document platen also incorporates a copy marker and a copy clamp.

Waters, U.S. Pat. No. 4,960,257, describes an improved document easel preferably for use with video display terminals, has a generally L-shaped bracket and a generally U-shaped member removably attached to the video display terminal. The generally L-shaped bracket is rotationally connected to a base member of a generally U-shaped bracket such that the U and L shaped brackets rotate with respect to each other about an axis of rotation that is generally perpendicular to the U-shaped bracket base member. A pair of arm members extend out from the U-shaped member and are attached to a document easel so as to provide rotational movement between the U-shaped member and the easel about an axis of rotation that is generally parallel to the base member of the U-shaped member. A hollow tube and rod combination provide a selectively adjustable tension/compression arrangement, thereby allowing reorientation of the easel relative to the video display terminal.

Gross/Cooper, U.S. Pat. No. 5,035,392, describes an accessory device for use in connection with a video terminal which comprises of an attachment mechanism for mounting a display board on either or both sides of a video terminal. The display boards are pivotable about both horizontal and vertical axes. The accessory includes a lighting fixture for illuminating the surface of each display board and a circuit for automatically adjusting the intensity of light produced by each lighting fixture to maintain a constant predetermined level of illumination on the surface of each display board. The video accessory increases the vertical work surface available for use by a video terminal operator and results in a work station area which is more comfortable for the video operator.

Bachman, U.S. Pat. No. 4,869,565, describes a universally adjustable display apparatus for fitment about and affixation to the housing of a computer monitor screen, for provision of indicia bearing surfaces substantially parallel to the front surface of the monitor screen. The display apparatus consists of two L-shaped display members with variable attachment means which permit overlapping attachment of the two display members while enabling the display apparatus to be horizontally expanded and contracting for adjustment to any width monitor screen housing.

McNeal, U.S. Pat. No. 5,125,612, describes a bracket for a video screen which is affixed thereto and holds worksheets for the terminal operator. The bracket includes a pair of ring-like components which pass through apertures in the worksheets over the laterally extending boom after use. An adjustable sheet support depends from the boom permits the operator to correctly bias the sheet which is being read for comfort and to prevent eyestrain.

Yu, U.S. Pat. No. 5,190,258, describes an articulated support for an audio amplifier housing comprising a first arm pivotable from a retracted position in the housing to an angularly extended position and then translatable in and out with respect to the housing, and a second arm pivotable at one end from a retracted position in the first arm to an angularly extended position, with an adjustable speaker mount at the other end of the second arm allowing a speaker to be rotated and tilted.

Spoonts, U.S. Pat. No. 5,639,060, describes a bracket assembly for mounting an audio speaker to a computer. The bracket assembly includes a mounting bracket having an upper section that is engaged with an upwardly facing surface of the monitor. A generally vertical side section depends from the upper section and is engaged with a side surface of the monitor. A generally horizontal platform section is interconnected to the side section and extends transversely from the side section and outwardly from the side surface of the monitor for supporting an audio speaker thereon. The mounting bracket is secured by an adhesive tape to the computer monitor.

The prior art teaches various means for supporting or mounting worksheets or other papers for the convenience of the typist sitting in front of a computer monitor. The prior art also teaches various bracket assembles which provide for variable mounting of audio components onto, or associated with a computer monitor. However, the prior art does not teach Z-shaped mounting brackets having rotatable speaker support shelves; the prior art does not teach the combination of a media storage means, a media drive means and side mounted vertical storage bins with loudspeaker mounting means configured for assembly with a computer monitor. The present invention fulfills these needs and provides further related advantages as described in the following summary.

SUMMARY OF THE INVENTION

The present invention teaches certain benefits in construction and use which give rise to the objectives described below.

The present invention provides an organizer apparatus for use with a computer monitor. The organizer apparatus has a base which is sized and shaped to rest on top of the computer monitor. The base has a bracket reception means, preferably a slot through either side of the base, or through the entire width of the base. The base may be adapted, in various embodiments, to support a variety of storage devices in several different configurations, including a media storage means such as a storage bin for CD-ROMs. The base also preferably includes a media drive means such as a CR-ROM and 3.5 inch floppy drive. A pair of brackets engage with the base in opposing locked positions. Each of the brackets includes an upper horizontal portion for engagement with the base, a vertical portion for laying adjacent to one side of the video monitor and a lower horizontal portion having the speaker supporting means. In the preferred embodiment, the organizer apparatus further includes a folder bin bonded to the monitor with two sided adhesive tape and positioned between the vertical portion of at least one of the brackets. The folder bin is designed for accepting paper folder storage therein.

A primary objective of the present invention is to provide a monitor mountable storage device and speaker holder having advantages not taught by the prior art.

Another objective is to provide a pair of Z-shaped mounting brackets which fit on either side of a computer monitor, each having rotatable loudspeaker support shelves and adjustment elbows for positioning the loudspeakers with respect to the user.

A further objective is to provide a media storage means and a media drive means in a base mounted above the computer monitor, thereby placing computer media within easy reach of the computer user.

A further objective is to provide a folder bin means mounted on the side of the monitor for further storage of important papers and folders.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 4 is a front elevational view thereof, similar to that of FIG. 3 but sans drives;

FIG. 5 is a front elevational view thereof, similar to that of FIG. 4, but showing further the addition of vertical storage bins;

DETAILED DESCRIPTION OF THE INVENTION

Figure 1:
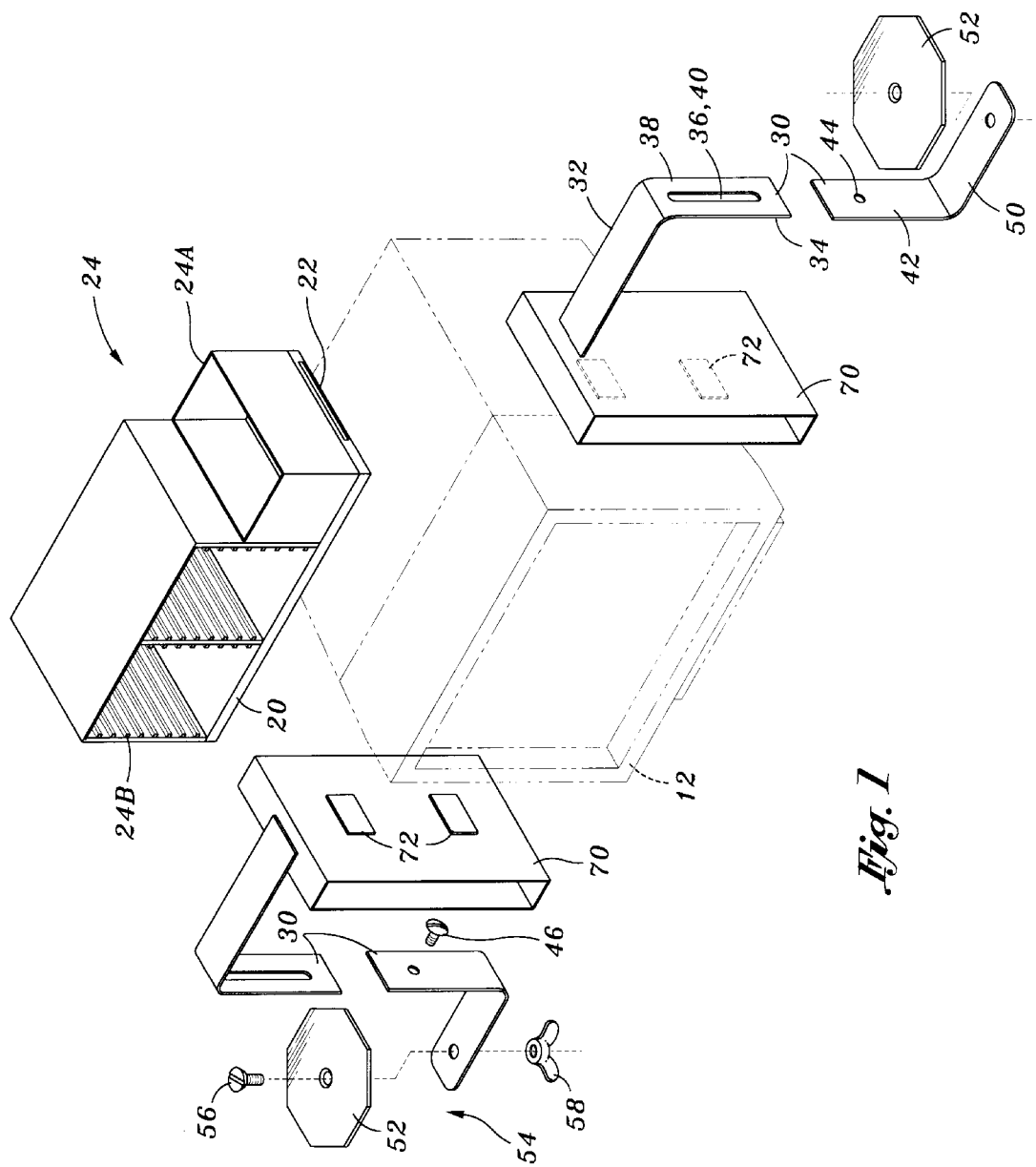
FIG. 1 is an exploded perspective view of the preferred embodiment of the present invention, showing a pair of brackets for engaging a base so as to be locked over a pair of folder bins for mounting on either side of a monitor, the base having a media storage compartment for CD-ROMs and 3.5 inch computer floppy disks.

The above described drawing figures illustrate the invention, an organizer apparatus 10 for use with a computer monitor 12. The organizer apparatus 10 has a base 20 which rests on top of the computer monitor 12; a pair of brackets 30 which are engagable with the base 20 rest, in one embodiment, against either side of the computer monitor 12; and each of the brackets 30 has a speaker supporting means 52 for holding a speaker 14. The base 20 and the pair of brackets 30 provide storage space for various equipment that is normally associated, and used, with a computer system, as described in greater detail below.

Figure 3:
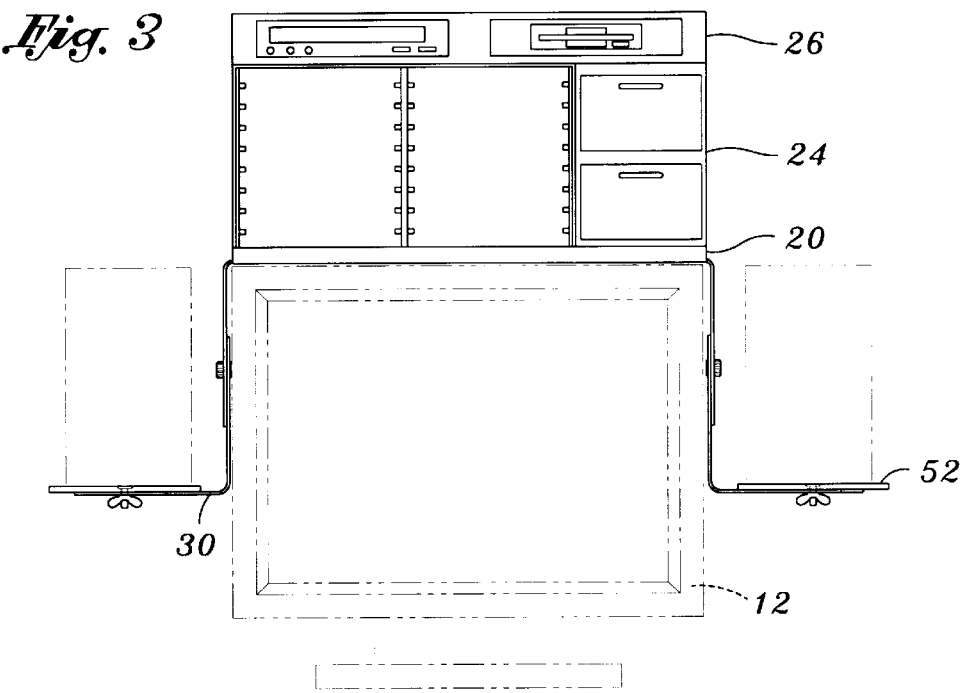
FIG. 3 is a front elevational view thereof similar to that of FIG. 2 and further including media storage cabinets.
Figure 2:
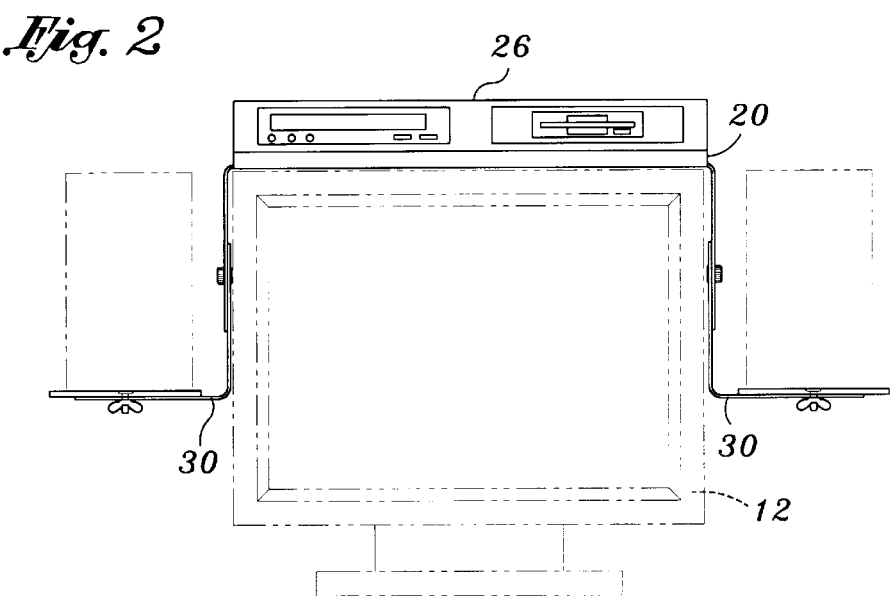
FIG. 2 is a front elevational view thereof, the base having an integral CD-ROM drive and 3.5 inch floppy drive.
Figure 6:
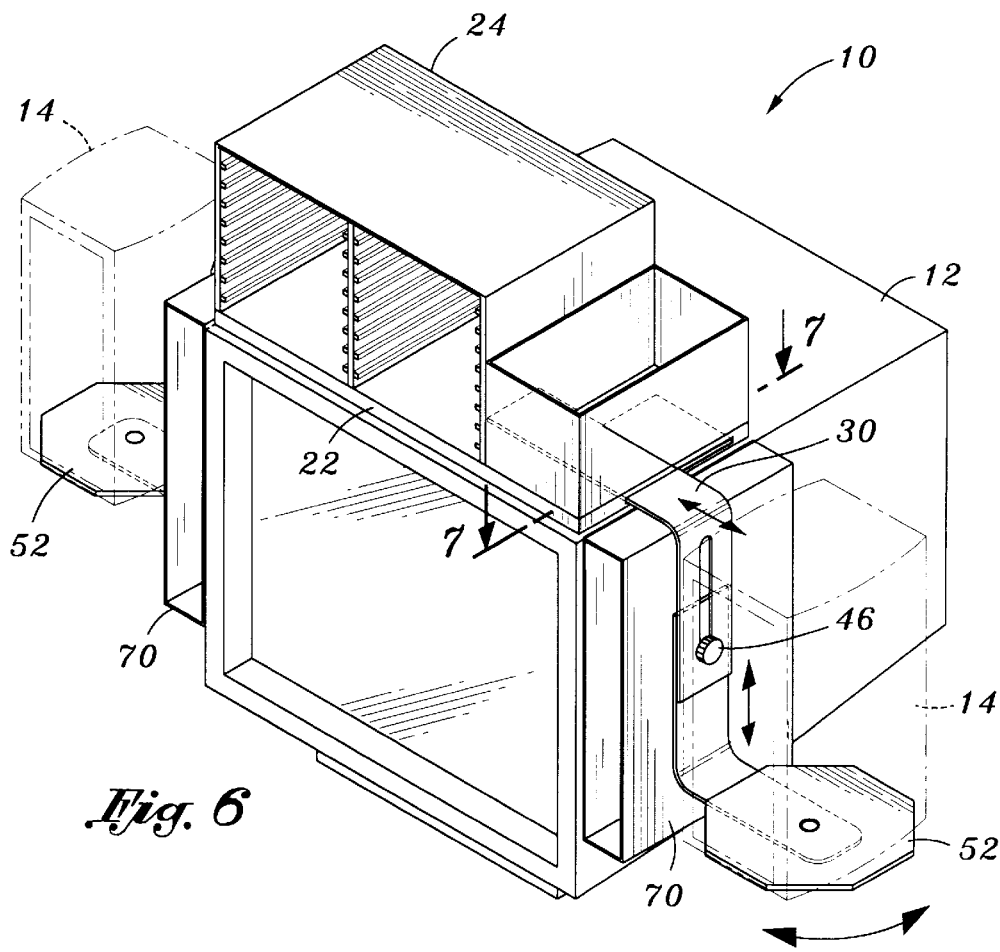
FIG. 6 is a perspective view similar to FIG. 1, showing how each of the pair of brackets fit into a slot in the base, and how the brackets each fit over a folder bin mounted on either side of the monitor, the brackets being adjustable and the speaker supporting shelves being rotatable.
Figure 7:
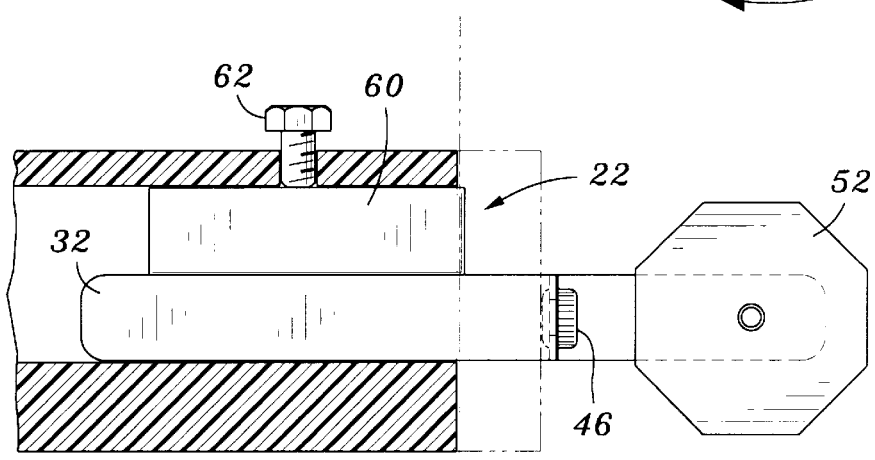
FIG. 7 is a sectional view thereof taken along line 7—7 in FIG. 6 showing the preferred means by which the brackets may be wedged into slots in the base.

The base 20 has a bracket reception means 22. The base 20 is sized and shaped to rest on a top surface of the computer monitor 12. The base 20 is preferably rectangular in shape and made of plastic, metal or wood. It is preferably approximately 14–21 inches wide, 6–8 inches deep, and ¾ to 1½ inch high. The width of the organizer apparatus 10 will vary depending on the size of the monitor 12 upon which the device is intended to be used. While 15 inch monitors are currently standard, 17 inch monitors will probably be standard in the near future, and 21 inch monitors are not uncommon. While the base 20 does not have to exactly fit the top of the monitor 12, it is desirable for aesthetic reasons. The bracket reception means 22, as best shown in FIGS. 6 and 7, is preferably an entry slot on either side of the base 20. This slot 22 is described in greater detail in the following paragraph. The base 20 preferably includes or is integral with, in various embodiments, a variety of devices. In a first embodiment, as shown in FIGS. 1 and 3–6, the base 20 includes an integral media storage means 24. The media storage means 24 includes, in one embodiment, a storage bin 24A for holding magnetic computer disks. This storage bin 24A is preferably sized to hold a specific media, such as 3.5 inch floppy disks or larger tape storage devices. The media storage means 24 includes, in a second embodiment, a storage bin 24B having a plurality of slots for accepting media cases such as a plurality of compact disks. In an alternative embodiment, the base 20 includes a media drive means 26. The media drive means 26 is either positioned on top of the base 20, as shown in FIG. 2, or on top of the media storage means 24, as shown in FIG. 3. The media drive means 26 is preferably a combination of a 3.5 inch floppy drive and a CD-ROM drive, each operably connected to the computer and electrically connected to a power source. By providing computer peripherals on top of the monitor 12 the user not only frees up space inside his computer, but also places the computer drives within easy reach and in close proximity to the computer media. The drives included in this invention are not limited to any type, size or configuration but may be any media storage drive.

The organizer apparatus 10 also preferably includes a pair of brackets 30 engagable with the base 20 in opposing locked positions therewith. Each of the brackets 30 includes an upper horizontal portion 32 for engagement with the base 20, a vertical portion 34 for laying adjacent to one side of the computer monitor 12 and a lower horizontal portion 50 having the speaker supporting means 52. Each of the brackets 30 is made of a rigid and durable material such as stainless steel or preferably plastic. Each of the brackets 30 is preferably about 2 inches wide and 3 millimeters thick and is preferably made of a rigid metal. The upper horizontal portion 32 is preferably about 7 inches long, the vertical portion 34 adjusts from between about 7–14 inches long, and the lower horizontal portion 50 is about 5 inches long. As shown in FIG. 6, the upper horizontal portion 32 of each of the brackets 30 preferably slidably inserts into the slot 22 so that each of the brackets 30 rests against one side of the computer monitor 12. The upper horizontal portion 32 of each of the brackets 30 just fits the slot 22 in height; however, the slot 22 is wider than the upper horizontal portion 32. This added width allows the brackets 30 to be positioned toward the front of the monitor or away from the front of the monitor so as to better position the loudspeaker depending on the needs of the user. Once the bracket 30 is properly positioned, the bracket 30 is wedged in place by a wedge means 60 for establishing a rigid connection of the horizontal portion within the slot 22, as shown in FIG. 7. The wedge means 60 is preferably a strip of plastic which, in conjunction with the upper horizontal portion 32 of the bracket 30, tightly fills the slot 22 and acts much like a wedge and so may, in fact, be wedge shaped. This wedge means 60 can be positioned on either side of the upper horizontal portion 32, thereby moving the bracket 30 forward or back for customized positioning. In an alternative embodiment, (not shown) the wedge means 60 may consist of two or more pieces which are placed on either side of the upper horizontal portion 32, thereby allowing more precise customization of the positioning of the upper horizontal portion 32 within slot 22. In its preferred embodiment, as shown in FIG. 7, the base 20 includes a locking screw 62 which compresses the upper horizontal portion 32 and the wedge means 60 inside the slot 22, locking the bracket 30 in place inside the slot 22 of the base 20. The vertical portion 34 of each of the brackets 30 has an extension means 36 for adjusting the length of the vertical portion 34, thus allowing the user to adjust the vertical positioning of the speaker supporting means 52. The vertical portion 34 preferably is formed with a first vertical arm 38 integrally attached to the upper horizontal portion 32 and a second vertical arm 42 integrally attached to the lower horizontal portion 50. The first vertical arm 38 has a longitudinal slot 40 and the second vertical arm 42 has a locking hole 44. A locking bolt 46 threadedly engages the locking hole 44 through the longitudinal slot 40 such that when the locking bolt 46 is tightened it locks the first and second vertical arms 38 and 42 together forming the vertical portion 34 of the bracket 30 having a customized length. The vertical portion 34 may also be set at an angle other then a straight angle so as to bias the loudspeaker slightly downward or upward.

The lower horizontal portion 50 of each the brackets 30 provides a speaker supporting means 52 such that a pair of speakers 14 may be mounted in laterally spaced apart positions adjacent the sides of the computer monitor 12. The speaker supporting means 52 provides a rotation means 54 for enabling rotation of the speakers 14 about a vertical axis. The rotation means 54 is preferable a screw 56 and wing nut 58. In the preferred embodiment, the speaker supporting means 52 is a simple speaker supporting shelf connected to the lower horizontal portion 50 with the screw 56 and wing nut 58. When the user loosens the wing nut 58, the speaker supporting shelf 52 can rotate to the desired position about the screw 56. The speaker 14 is attached to the speaker supporting shelf 52, preferably with a double sided bonding tape. This arrangement allows for speakers to be firmly fixed into a desired position, but still allows for easy adjustment of the speakers 14 when needed.

In the preferred embodiment, the organizer apparatus 10 further includes a folder bin means 70 positioned between the vertical portion 34 of at least one of the brackets 30. The folder bin means 70 is designed for accepting paper folder storage therein. As shown in FIGS. 1, 5, and 7, the folder bin means 70 is preferably a rectangular box with an open front side corresponding to the front of the monitor 12. Papers, folders and other miscellaneous items are stored within the rectangular box 70. As shown in FIG. 1, the folder bin means 70 is preferably bonded directly to the side of the monitor 12 with two sided adhesive tape. The upper horizontal portion 32 of brackets 30 are then inserted into the slot 22 until the vertical portion 34 presses against the folder bin means 70, further holding the folder bin means 70 in place.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An organizer apparatus and computer monitor combination comprising:

a computer monitor providing a pair of spaced apart side surfaces and a top surface;

a base having a bracket reception means, the base adapted for resting upon the top surface of the computer monitor;

a pair of brackets engagable with the base in opposing locked positions therewith, each of the brackets providing a vertical portion thereof, the vertical portions being positionable for resting against the side surfaces of the computer monitor and alternately positionable for resting in a spaced apart relationship with the side surfaces of the computer monitor;

each of the brackets providing a generally horizontal speaker supporting means such that a pair of speakers may be supported in laterally spaced apart positions adjacent the sides of the computer monitor; and a media storage means integral with the base.

2. The apparatus of claim 1 further including a folder bin means positioned between the vertical portion of at least one of the brackets and one of the opposing sides of the computer monitor when the vertical portion is in said alternate position, the folder bin means adapted for accepting paper folder storage therein.

3. The apparatus of claim 1 wherein the speaker supporting means further comprises a rotation means for enabling rotation of the speakers about a vertical axis so as to direct sound therefrom preferentially.

4. The apparatus of claim 1 wherein the media storage means provides a plurality of slots for accepting media cases.

5. The apparatus of claim 4 wherein the media storage means provides space for accepting a plurality of compact disks, the media storage means further including a storage bin for accepting a plurality of magnetic diskettes.

6. The apparatus of claim 1 wherein the bracket reception means is a slot, an upper horizontal portion of each of the brackets adapted for sliding within the slot and for being clamped therein by a wedge means for establishing a rigid connection of the horizontal portion within the slot.

7. The apparatus of claim 1 wherein the vertical portion provides extension means for adjusting the vertical position of the speaker supporting means.

8. The apparatus of claim 1 further including a folder bin means positioned between the vertical portion of at least one of the brackets, the folder bin means accepting paper folder storage therein.

9. The apparatus of claim 1 further including a media drive means positioned on top of the media storage means.

10. The apparatus of claim 1 further including a media drive means positioned on top of the base.

* * * * *